US012570316B2

(12) United States Patent
Pendleton et al.

(10) Patent No.: US 12,570,316 B2
(45) Date of Patent: Mar. 10, 2026

(54) SYSTEMS AND METHODS FOR GRIDLOCK PREVENTION

(71) Applicant: Motional AD LLC, Boston, MA (US)

(72) Inventors: Scott D. Pendleton, Singapore (SG);
Zhe Jie Chua, Singapore (SG);
Shu-Kai Lin, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 81 days.

(21) Appl. No.: 18/150,892

(22) Filed: Jan. 6, 2023

(65) Prior Publication Data

US 2023/0415774 A1     Dec. 28, 2023

Related U.S. Application Data

(60) Provisional application No. 63/354,714, filed on Jun. 23, 2022.

(51) Int. Cl.
B60W 60/00     (2020.01)

(52) U.S. Cl.
CPC .... B60W 60/0011 (2020.02); B60W 60/0027 (2020.02)

(58) Field of Classification Search
CPC ...................... B60W 60/0011; B60W 60/0027
See application file for complete search history.

(56) References Cited

U.S. PATENT DOCUMENTS

| | | | | |
|---|---|---|---|---|
| 11,092,961 | B2 * | 8/2021 | Battles | G01C 21/3617 |
| 2018/0004215 | A1 * | 1/2018 | Miller | B60W 50/0097 |
| 2019/0049960 | A1 * | 2/2019 | Battles | B60W 30/095 |
| 2019/0107840 | A1 * | 4/2019 | Green | G05D 1/0223 |
| 2020/0110414 | A1 * | 4/2020 | Dupre | B60W 60/0015 |
| 2020/0301435 | A1 * | 9/2020 | Phillips | G05D 1/0217 |
| 2021/0108936 | A1 * | 4/2021 | Seegmiller | B60W 60/00276 |
| 2021/0316750 | A1 * | 10/2021 | Jo | B60W 30/18154 |
| 2022/0066461 | A1 * | 3/2022 | Green | G05D 1/0088 |
| 2022/0340137 | A1 * | 10/2022 | Ollis | B60W 30/09 |
| 2023/0126130 | A1 * | 4/2023 | Jeong | G01C 21/3881 |
| | | | | 701/533 |
| 2023/0127185 | A1 * | 4/2023 | Jeong | G01C 21/3819 |
| | | | | 701/25 |
| 2023/0168098 | A1 * | 6/2023 | Ueno | G01C 21/3492 |
| | | | | 701/24 |

(Continued)

FOREIGN PATENT DOCUMENTS

| | | | |
|---|---|---|---|
| DE | 10 2016 223 800 A1 | 5/2018 | |
| EP | 3792127 A1 * | 3/2021 | ...... B60W 30/18154 |

OTHER PUBLICATIONS

International Search Report and Written Opinion received for PCT Patent Application No. PCT/US2023/068915, mailed Oct. 9, 2023.

(Continued)

*Primary Examiner* — Anil K Bhargava
(74) *Attorney, Agent, or Firm* — Knobbe, Martens, Olson & Bear, LLP

(57)     ABSTRACT

Provided are methods for gridlock prevention, which can include obtaining sensor data, obtaining an intersection parameter, and determining a constraint. Some methods described also include generating trajectories and providing data associated with a selected trajectory, such as for operation of an autonomous vehicle along the trajectory. Systems and computer program products are also provided.

12 Claims, 16 Drawing Sheets

(56)          References Cited

U.S. PATENT DOCUMENTS

2024/0140487 A1\*   5/2024   Green   ................. G05D 1/0221

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Preliminary Report on Patentability received for PCT Patent Application No. PCT/US2023/068915, mailed Jan. 2, 2025.

\* cited by examiner

1002    Obtain sensor data

1004    Obtain an intersection parameter

1006    Determine at least one constraint

1008    Generate a plurality of trajectories

1010    Select a trajectory

1012    Provide data associated with the trajectory

1000

SYSTEMS AND METHODS FOR GRIDLOCK PREVENTION

CROSS-REFERENCE TO RELATED APPLICATIONS

The present application claims priority/benefit from U.S. Provisional Application No. 63/354,714 filed on Jun. 23, 2022, entitled "SYSTEMS AND METHODS FOR GRIDLOCK PREVENTION," which is herein incorporated by reference in its entirety.

BACKGROUND

Various countries apply road markings to their infrastructure to avoid a prolonged halt in traffic flow at intersections and lane merge, also known as gridlock. In Singapore, these markings are often called "yellow box" and in the United Kingdom "box junction". The United States may use other designations as well, such as a "keep clear" area.

Compliance with the particular rules of intersections is non-trivial. For example, ingress directional specific constraints are not formalized in legislation. Further, some constraints are exercised as "driver courtesy" (e.g., not formalized), even at intersections without infrastructure markings.

Legislation that does exist struggles to formalize the rules for all but simple cases, yet are designated high priority. Example difficult cases to formalize include exceptions for turning pockets (marked or unmarked), signaled but "inactive" crosswalks (e.g., ones a vehicle would cross while travelling straight on green light), and inferred "keep clear" areas for minor roads/driveways/parking lots.

While humans generally know how to comply with road markings for gridlock, and further understand "courtesy" practices where roads are not marked, it can be increasingly difficult for autonomous vehicles to properly react at intersections.

DETAILED DESCRIPTION

Figure 1:
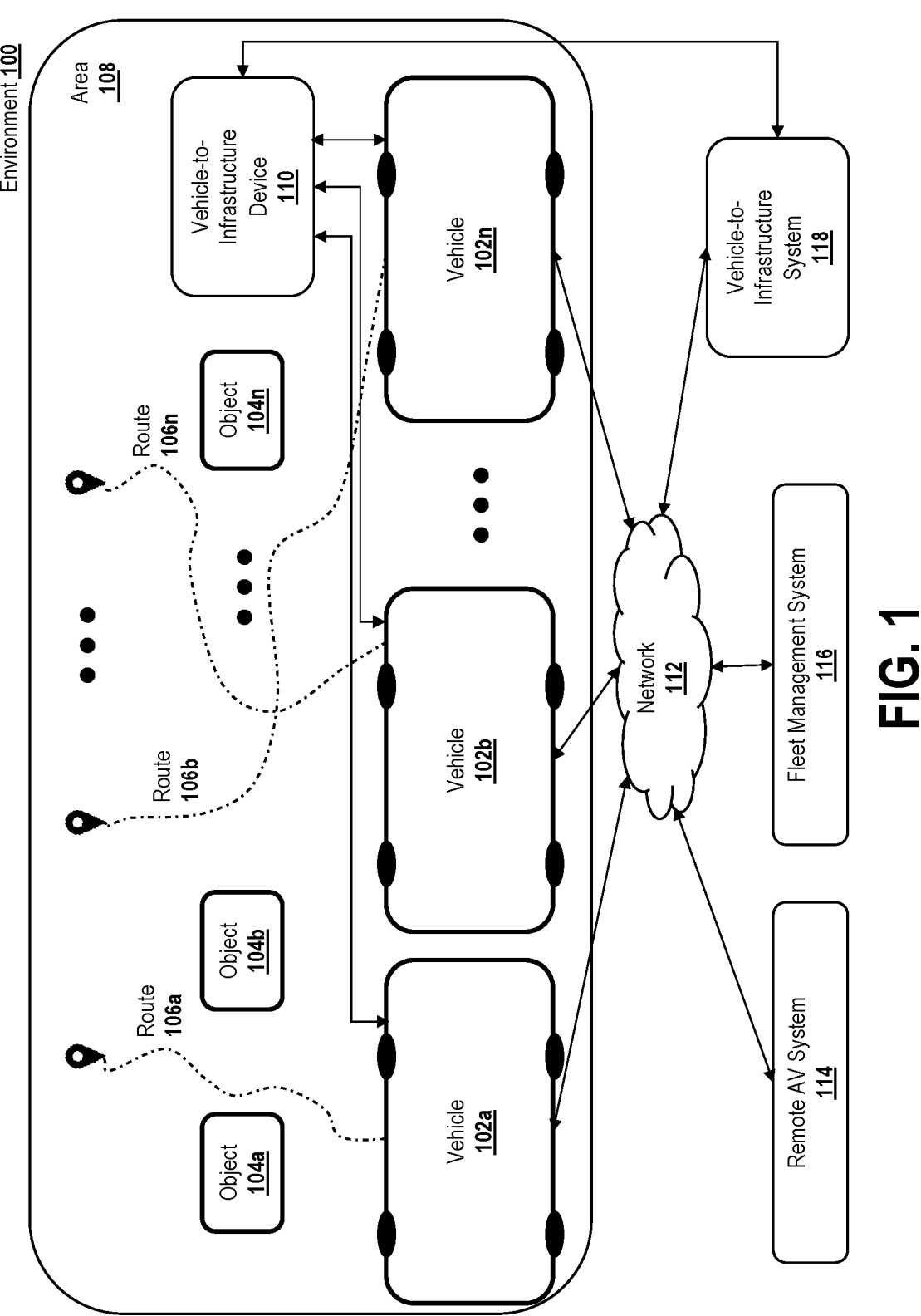
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method for gridlock prevention. The method includes obtaining using at least one processor, sensor data associated with an environment in which an autonomous vehicle is operating. In one or more embodiments or examples, the sensor data is generated by at least one sensor of an autonomous vehicle operating in the environment. The method includes obtaining, using the at least one processor, an intersection parameter indicative of an intersection boundary for an intersection located in the environment. The method includes determining, using the at least one processor, at least one constraint based on a state of the autonomous vehicle. In one or more embodiments or examples, the at least one constraint minimizes a likelihood that operation of the autonomous vehicle results in a gridlock state of the intersection. The method includes generating, using the at least one processor, a plurality of trajectories for operation of the autonomous vehicle. The method includes selecting, using the at least one processor, based on the at least one constraint, a trajectory of the plurality of trajectories. In one or more embodiments or examples, the trajectory minimizes the likelihood that operation of the autonomous vehicle results in the gridlock state. The method includes providing, using the at least one processor, data associated with the trajectory. In one or more embodiments or examples, the data associated with the trajectory is configured to cause operation of the autonomous vehicle along the trajectory.

By virtue of the implementation of systems, methods, and computer program products described herein, techniques for gridlock prevention. Some of the advantages of these techniques include recognizing potential intersections and operating the autonomous vehicle in order to minimize and/or prevent gridlock situations. The techniques disclosed can advantageously be used in both marked and unmarked intersections.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 10:
FIG. 10 is a flowchart of an example process for gridlock prevention.
Figure 10:
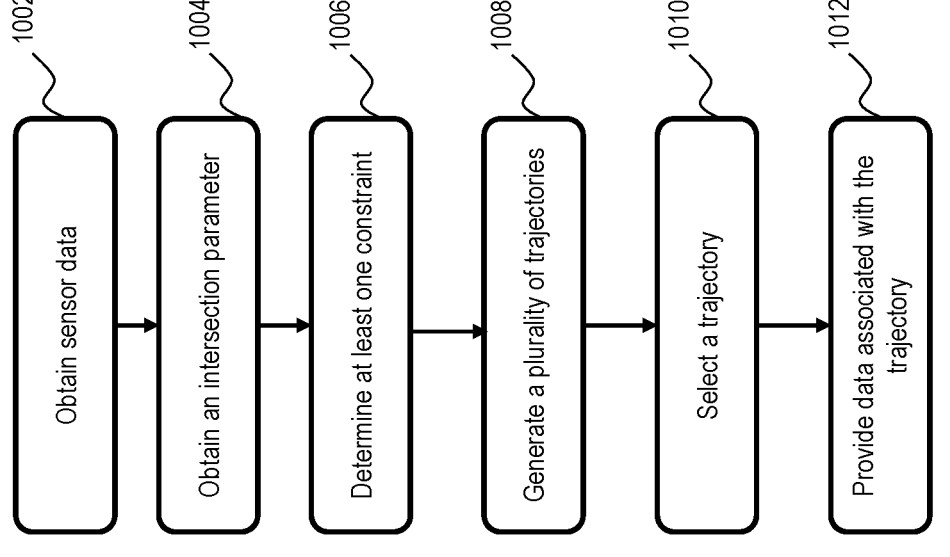

In some embodiments, device 300 is configured to execute software instructions of one or more steps of the disclosed method, as illustrated in FIG. 10.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
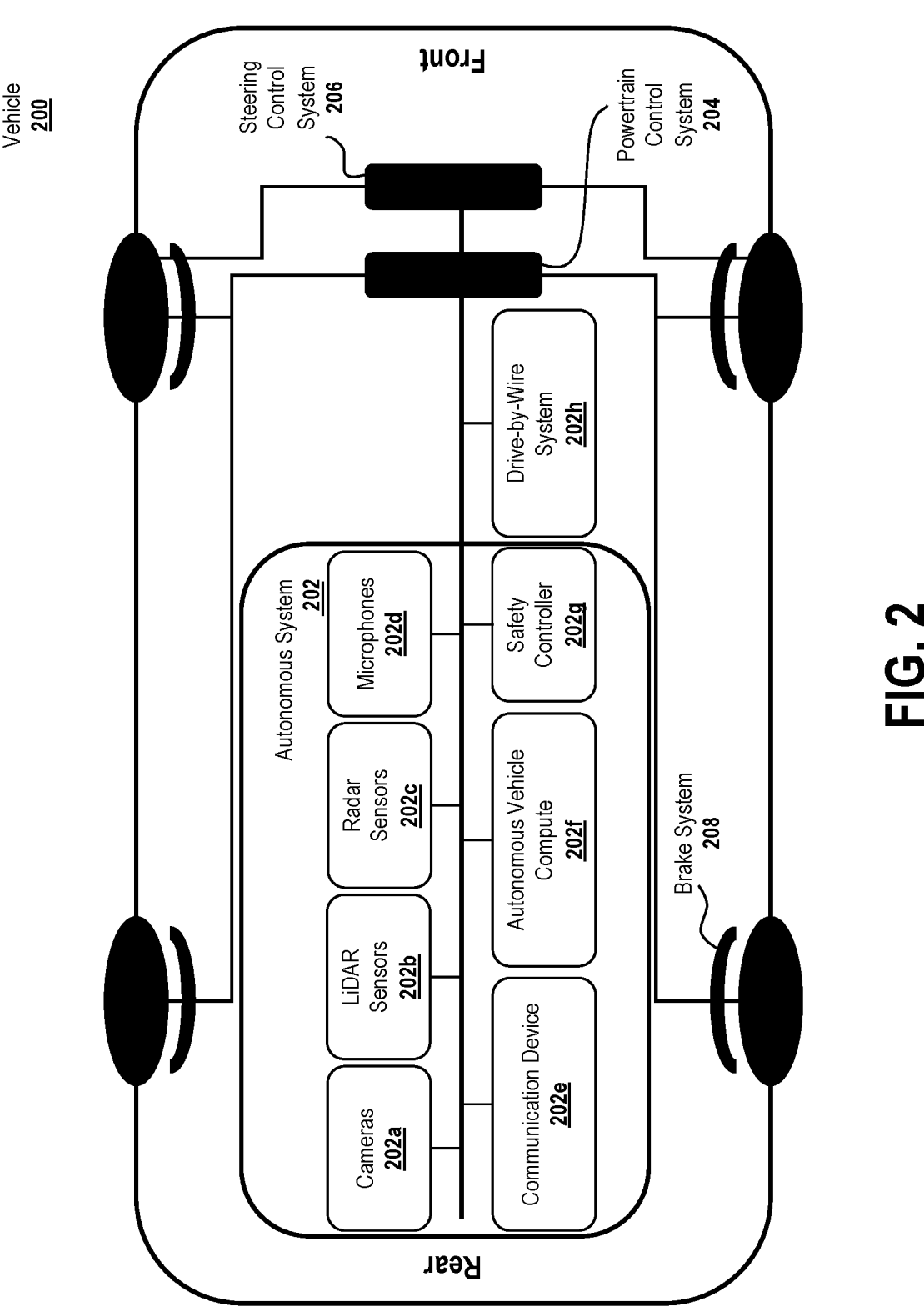
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
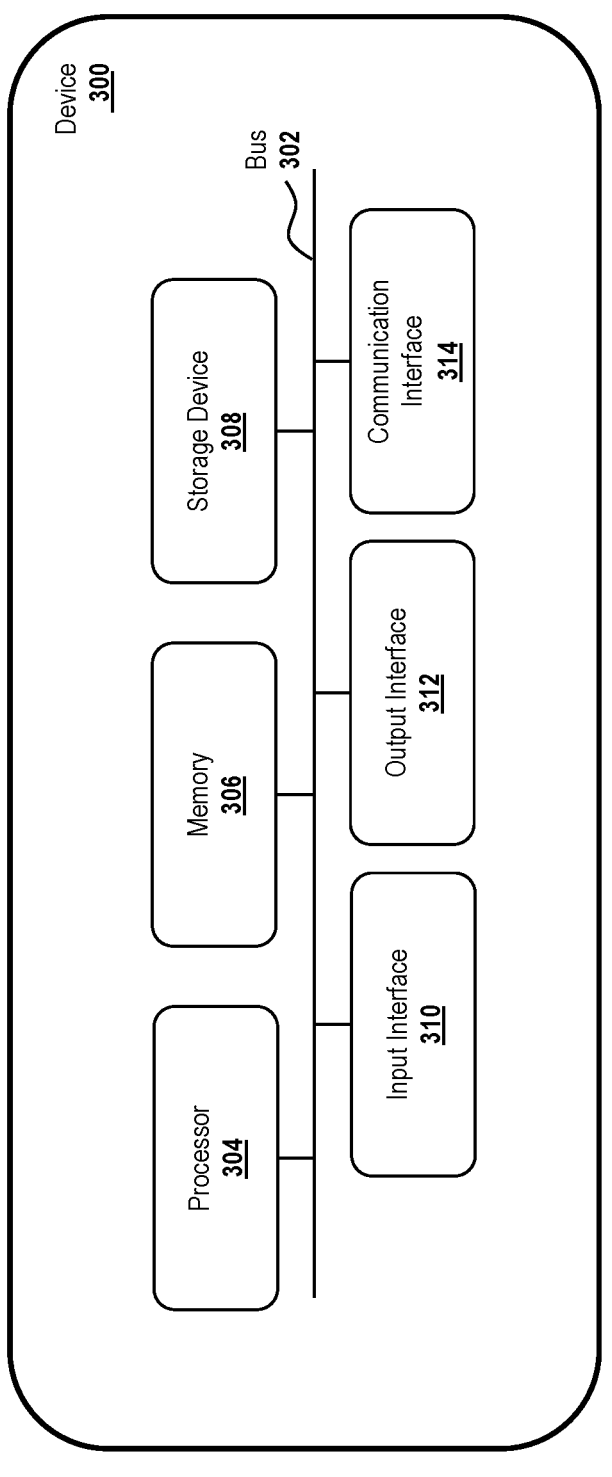
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
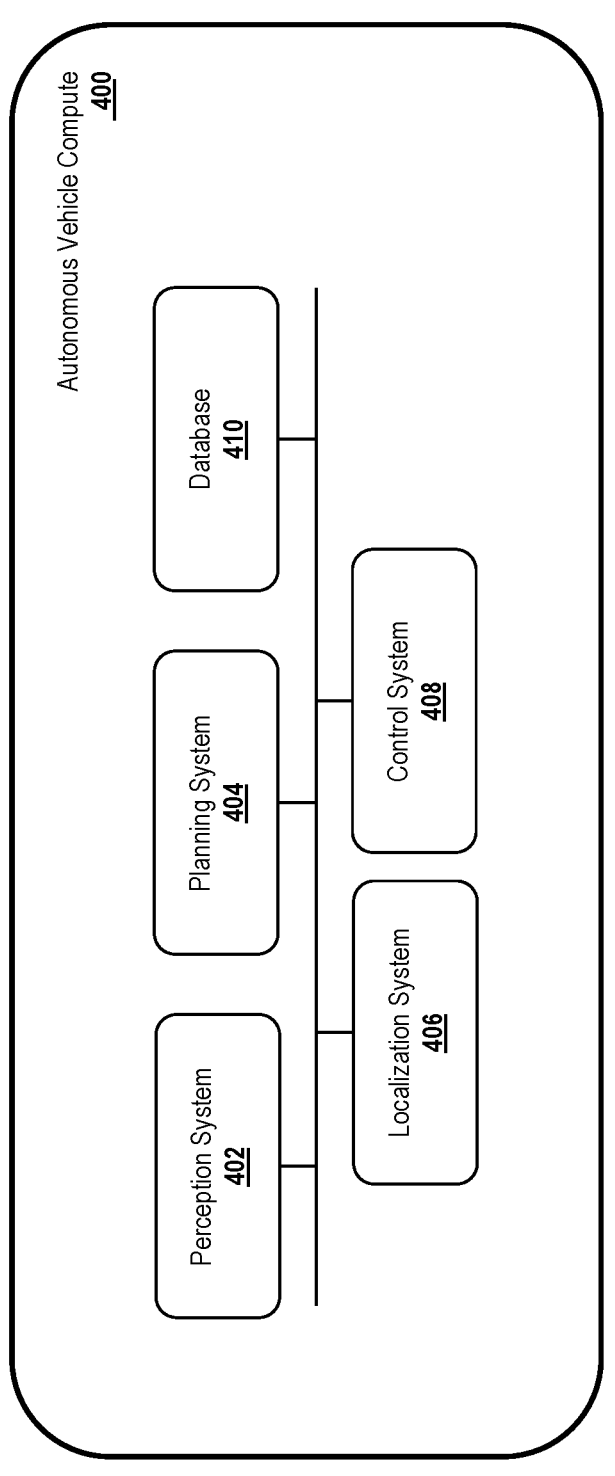
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like).

In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

The present disclosure relates to systems, methods, and computer program products that provide for determining of potential intersections during operation of an autonomous vehicle and for, at an intersection, determining potential trajectories that the autonomous may take in order to minimize and/or prevent gridlock (e.g., a gridlock state) at the intersection. The disclosed systems, methods, computer program products can use conditional longitudinal progress constraints and/or velocity constraints for preventing intersection gridlock. Further, the disclosed systems, methods, and computer program products can leverage a combination of road markings, overlap of lane connectors, and semantics for distinguishing lane relationships, such as convergent, divergent, and disjoint lane relationships.

There are at least three primary types of gridlock that can be advantageously reduced based on the disclosure. The first is crosswalk gridlock, which is caused by a vehicle stopping on a crosswalk, thereby impeding pedestrians. The second is marked intersection gridlock, which is when a vehicle is stopped in a marked intersection, thereby impeding road traffic through the intersection. This type of gridlock can be more significant than crosswalk gridlock, and may carry a higher penalty as discussed herein. The third is unmarked intersection gridlock prevention, also known as the courtesy rule. This includes, for example, a vehicle stopped at a driveway entrance onto a road.

The constraints on an autonomous vehicle for the above-discussed gridlock follow a common pattern of not impeding motion through an intersection, whether marked or unmarked. However, there may be variability in the "keep clear" region definition. For example, a crosswalk is different from a stop sign intersection. Further, the severity of the penalty for non-compliance can vary.

Figure 5:
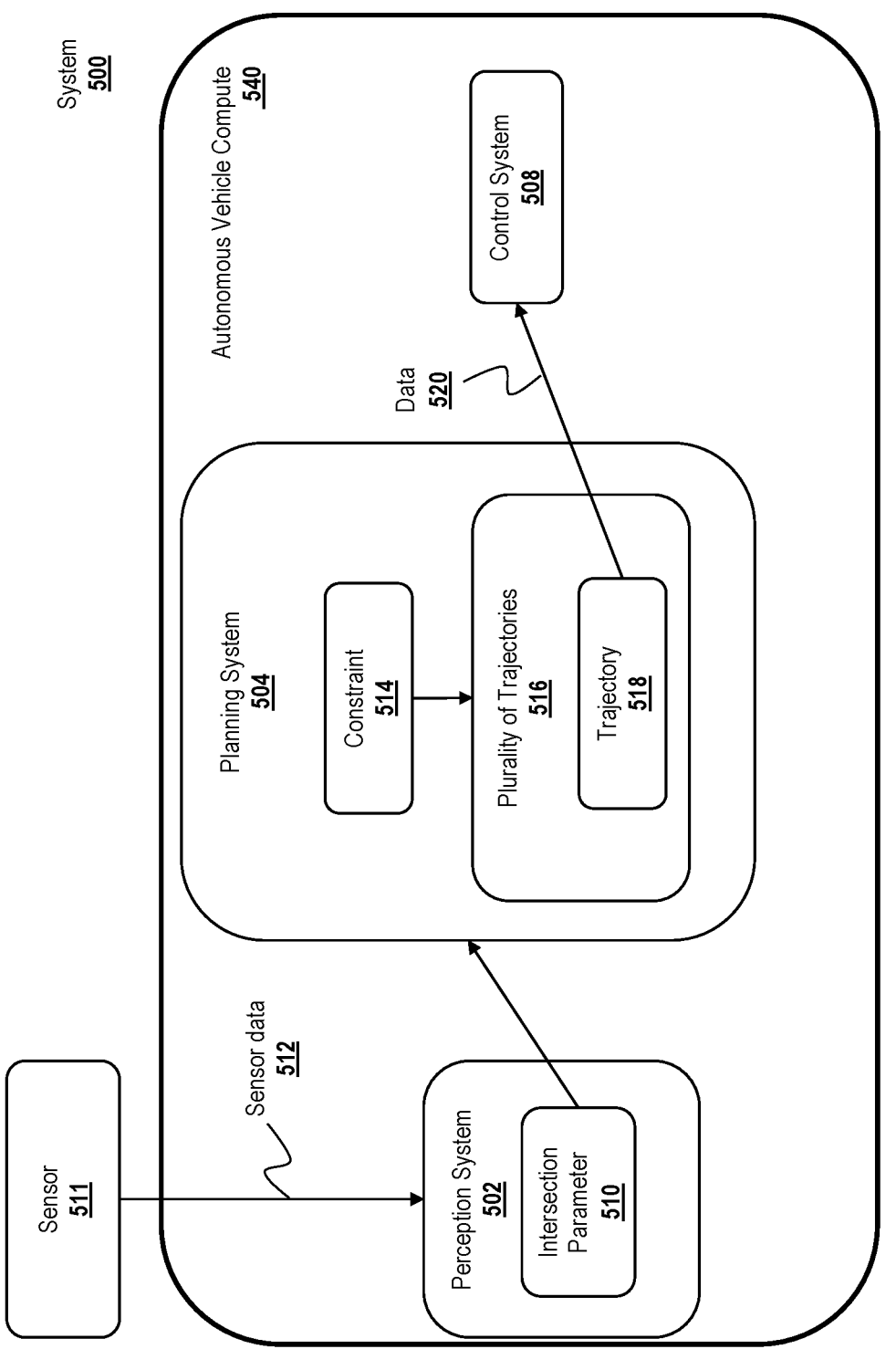
FIG. 5 is a diagram of an example implementation of a process for gridlock prevention.

Referring now to FIG. 5, illustrated is a diagram of a system 500 for gridlock prevention. In some embodiments, system 500 is connected with and/or incorporated in a vehicle (e.g., an autonomous vehicle that is the same as, or similar to, vehicle 102, 200 of FIGS. 1 and 2). In one or more embodiments or examples, system 500 is in communication with and/or a part of an AV (e.g., such as Autonomous System 202 illustrated in FIG. 2, device 300 of FIG. 3), an AV system, an AV compute (such as AV compute 202f of FIG. 2 and/or AV compute 400 of FIG. 4), a remote AV system (such as remote AV system 114 of FIG. 1), a fleet management system (such as fleet management system 116 of FIG. 1), and a V2I system (such as V2I system 118 of FIG. 1). The system 500 can be for operating an autonomous vehicle. The system 500 may not be for operating an autonomous vehicle.

In one or more embodiments or examples, the system 500 includes one or more of: a planning system 504, a perception system 502, and a control system 508 that are the same as, or similar to, the planning system 404, the perception system 402, and the control system 408 of FIG. 4, respectively.

A system 500 is disclosed. The system 500 includes at least one processor. The system 500 includes at least one memory storing instructions thereon that, when executed by the at least one processor, cause the at least one processor to perform operations including obtaining sensor data 512 associated with an environment in which an autonomous vehicle is operating. In one or more embodiments or examples, the sensor data 512 is generated by at least one sensor 511 of an autonomous vehicle operating in the environment. The operations include obtaining an intersection parameter 510 indicative of an intersection boundary for an intersection located in the environment. The operations include determining, using the at least one processor, at least one constraint 514 based on a state of the autonomous vehicle. In one or more embodiments or examples, the at least one constraint 514 minimizes a likelihood that operation of the autonomous vehicle results in a gridlock state of the intersection. The operations include generating a plurality of trajectories 516 for operation of the autonomous vehicle. The operations include selecting based on the at least one constraint 514, a trajectory 518 of the plurality of trajectories 516. In one or more embodiments or examples, the trajectory 518 minimizes the likelihood that operation of the autonomous vehicle results in the gridlock state. The operations include providing data 520 associated with the trajectory 518. In one or more embodiments or examples, the data 520 associated with the trajectory 518 is configured to cause operation of the autonomous vehicle along the trajectory 518.

In one or more examples or embodiments, the disclosed system 500 is configured to determine an intersection in an environment and provide data 520 allowing the autonomous vehicle to operate safely through the intersection while minimizing a gridlock state. One or more constraints, such as at least one constraint 514, can be used to select a particular trajectory 518 for operation of the autonomous vehicle. The system 500, for example, uses sensor data 512 for determining a safe trajectory through the intersection while minimizing gridlock.

In one or more examples or embodiments, the system 500 is configured to obtain sensor data 512 using a perception system 502 (which can be similar to the perception system 402 of FIG. 4). The sensor data 512 can be one or more of: radar sensor data, camera sensor data, image sensor data, audio sensor, and LIDAR sensor data. The particular type of sensor data is not limiting. The sensor data 512 can be indicative of an environment around an autonomous vehicle. For example, the sensor data 512 can be indicative of an object, and/or a plurality of objects, in the environment around an autonomous vehicle.

In one or more examples or embodiments, the system 500 obtains the sensor data 512 from at least one sensor 511. The at least one sensor 511 can be one or more sensors, such as an onboard sensor. The at least one sensor 511 may be associated with the autonomous vehicle. An autonomous vehicle may include one or more sensors that can be configured to monitor an environment where the autonomous vehicle operates, such as via the at least one sensor 511, through sensor data 512. For example, the monitoring can provide sensor data 512 indicative of what is happening in the environment around the autonomous vehicle, such as for determining trajectories of the autonomous vehicle. Sensors can include one or more of the sensors illustrated in FIG. 2. The at least one sensor 511 may be one or more of the sensors (202a, 202b, 202c, 202d) illustrated in FIG. 2.

The at least one sensor 511 can be one or more of: a radar sensor, a camera sensor, a microphone, an infrared sensor, an image sensor, and a LIDAR sensor.

In one or more examples or embodiments, the system 500 is configured to obtain an intersection parameter 510. The system 500, for example, uses a perception system 502 to obtain the intersection parameter. In one or more embodiments or examples, obtaining the intersection parameter 510 includes obtaining, based on the sensor data 512, the intersection parameter 510. In other words, the system 500 can make a determination of an intersection, and respective boundaries of said intersection, based on sensor data 512 that it obtains. This can be known as online intersection parameter determination. In one or more examples or embodiments, the system 500 is configured to obtain the intersection parameter 510 from a memory (such as internal to the vehicle or on a server, such as memory 306 of FIG. 3). For example, the system 500 obtains the intersection parameter 510 from a database (such as database 410 of FIG. 4) and/or a storage device (such as storage device 308 of FIG. 3). In this situation, the system 500 may not use the sensor data 512 for the determination of the intersection parameter 510, which can also be known as offline intersection parameter determination.

In one or more examples or embodiments, the intersection parameter 510 is indicative of one or more features of an intersection. For example, the intersection parameter 510 is indicative of one or more features such as boundaries, delineations, lanes, and signage of the intersection. The intersection parameter 510 includes, for example, one or more spatial parameters characterizing boundaries, delineations, and/or lanes of an intersection. While the term "intersection" is used, it will be understood that an intersection may not merely be a standard multi-way road crossing, but any instance in which an agent in the environment may be able to legally enter or exit an area where the autonomous vehicle is operating. In one or more embodiments or examples, the intersection parameter 510 is indicative of one or more of: a bus stop, a cross walk, a vehicular intersection, an area associated with a vehicle intersection, and a driveway. For example, intersection parameter 510 includes one or more intersection type parameters, such as a bus stop, a cross walk, a vehicular intersection, an area associated with a vehicle intersection, and/or a driveway. The intersection parameter 510 is, for example, indicative of intersection boundaries of different types of intersections, such as marked intersections, unmarked intersections, cross-roads, yellow boxes, box junctions, and keep clear areas. The intersection parameter 510 includes, for example, an intersection type parameter characterizing the type of the intersection, such as marked intersection, unmarked intersection, cross-road, yellow box, box junction, and keep clear area.

In one or more examples or embodiments, the intersection parameter 510 includes a turn parameter. The turn parameter is, for example, indicative of a turn boundary (e.g., delineation, turn pocket) within the intersection boundary. For example, vehicles may be allowed to enter an intersection in order to make a turn crossing traffic (e.g., a left hand turn in a four-way intersection in the United States).

In one or more examples or embodiments, sensor data 512 is indicative of infrastructure in the environment. This can allow the system 500 to make determinations on actions that the autonomous vehicle can take. In one or more embodiments or examples, the sensor data is indicative of one or more of: traffic light status and crosswalk status. A traffic light status is, for example, a green light, a yellow light, or a red light. A crosswalk status is, for example, a walk status or a don't walk status. The system 500 can be configured for active determination, based on the sensor data 512, of a traffic light status and/or a cross walk status. An active status is when agents are legally allowed to cross into a lane that the autonomous vehicle is located in. The system 500 can be configured for inactive determination, based on the sensor data 512, of a traffic light status and/or a cross walk status. An inactive status is when agents are not legally allowed to cross into a lane that the autonomous vehicle is in. In one or more examples or embodiments, the system 500 is configured to infer a status of a traffic light and/or a cross walk status based on the sensor data 512. For example, if pedestrians are crossing a crosswalk, the system 500 is configured to infer that the cross walk status is "walk" (e.g., active) without necessarily having sensor data indicative of the actual state of the cross walk.

In one or more examples or embodiments, the system 500 uses a planning system 504 (similar to planning system 404 of FIG. 4) to determine actions that can be taken by the autonomous vehicle. The system 500, for example, determines at least one constraint 514 for selecting a particular trajectory to take. The at least one constraint 514 can be seen as a particular action or limitation of an action that the autonomous vehicle can take. An example of the at least one constraint 514 is the autonomous vehicle not having a velocity of 0 on the highway. Another example at least one constraint 514 is the autonomous vehicle reducing velocity to a particular threshold when approaching a crosswalk. The at least one constraint 514 can vary based on a state of the autonomous vehicle. The state of the autonomous vehicle is, for example, one or more of speed, velocity, acceleration, location, and time to take an action. The at least one constraint 514 may differ, as an example, when the autonomous vehicle is moving at 70 mph as compared to 20 mph.

Advantageously, the at least one constraint 514 discussed herein can minimize the likelihood that operation of the autonomous vehicle results in a gridlock state of the intersection. In other words, the at least one constraint 514 can be used to prevent the autonomous vehicle from blocking an intersection, which would cause a gridlock state. A gridlock state can be seen as a state in which the autonomous vehicle impedes the legal movement of a pedestrian, a bicycle, and/or a vehicle at an intersection. While there may be conflicting legality to completely prevent a gridlock state, it is still advantageous to reduce the likelihood of a gridlock state occurring.

In one or more embodiments or examples, determining the at least one constraint 514 based on the state of the autonomous vehicle includes determining a longitudinal progress constraint and/or a velocity constraint. For example, the at least one constraint 514 is based on one or more of velocity, acceleration, or position (e.g., location). The longitudinal progress constraint can be along a single horizontal line and/or a two dimensional area. The longitudinal progress constraint can be in the time-space domain (S-T domain). An example longitudinal progress constraint includes the system 500 operating the autonomous vehicle so that it passes through the intersection boundary within a time threshold. The time threshold can be based on the traffic light cycle, such as determined from sensor data 512. The time threshold can be a stored value. An example velocity constraint includes the system 500 operating the autonomous vehicle so that it maintains a speed above 0 within the intersection boundary. Other constraints can be used as well. For example, the at least one constraint 514 includes avoiding objects within the intersection boundary, or taking action based on traffic light status.

In one or more examples or embodiments, the system 500 further uses the planning system 504 for generating a plurality of trajectories 516 that the autonomous vehicle may be able to take. In one or more examples or embodiments, the system 500 only generates a single trajectory, such as when there is only one allowable trajectory to take.

In one or more embodiments or examples, generating the plurality of trajectories 516 includes determining, based on the sensor data 512, an agent in the environment. In one or more embodiments or examples, generating the plurality of trajectories 516 includes predicting movement of the agent. In one or more examples or embodiments, generating the plurality of trajectories 516 includes generating, based on the movement of the agent, the plurality of trajectories 516. An agent may be considered a dynamic object in the environment. Agents include, for example, pedestrians, bicycles, motorcycles, and vehicles. The system 500, in some examples, is configured to generate the plurality of trajectories 516 so as not to intersect with a trajectory of any one of the agents in the environment and/or predicted trajectories of the agents.

In one or more examples, the system 500 is configured to predict the movement of the agent, such as a trajectory of the agent. For example, the system 500 includes a model and/or neural network system for determining and/or predicting the movement of the agent. For example, the system 500 determines and/or predicts, based on a model and/or neural network, the movement of the agent. For example, the system 500 inputs sensor data 512 into the model and/or neural network for predicting the movement of any agents.

From the plurality of trajectories 516, the system 500, for example, selects a trajectory 518. In one or more examples and embodiments, the system 500 selects the trajectory 518 based on the at least one constraint 514 in order to minimize the likelihood that operation of the autonomous vehicle results in a gridlock state. The system 500 can consider any other agents in the environment when selecting the trajectory 518. The system 500 can be configured to provide data 520, such as control data, in order to cause operation of the autonomous vehicle. Providing data 520 associated with the trajectory 518 can include generating control data (e.g., based on the data 520) for a control system 508 (similar to control system 408 of FIG. 4) of an autonomous vehicle. The system 500, in some examples, provides control data to the control system 508. The system 500, in some examples, transmits control data to, e.g., a control system of an autonomous vehicle and/or an external system. In one or more embodiments or examples, the operations of system 500 include operating, based on the data 520 associated with the trajectory 518, the autonomous vehicle.

In one or more embodiments or examples, the system 500 is configured to use one or more penalty parameters for violation of one or more rules by the autonomous vehicle. In one or more embodiments or examples, the system includes determining, based on the sensor data 512 and a rule of the autonomous vehicle, a penalty parameter indicative of a violation of the rule. In one or more embodiments or examples, selecting the trajectory 518 of the plurality of trajectories 516 includes selecting, based on the penalty parameter, the trajectory 518 of the plurality of trajectories 516. The rule, for example, can be stored, such as in memory 306 of FIG. 3, storage device 308 of FIG. 3, and/or database 410 of FIG. 4. The system 500 can be configured to obtain the rule. The rule can be obtained from a data structure storing a hierarchy of rules (sometimes referred to as a rulebook) of the autonomous vehicle.

In some embodiments, the planning system 504 can access data including rules used for planning. For example, rules are specified using a formal language, e.g., using Boolean logic. In some examples, the rules are rules of the road, rules of passenger comfort, and/or rules of expression. In some examples, rules of the road define whether or not a particular maneuver is permitted in the lane of travel of the vehicle and/or in the environment of the vehicle. For example, the rulebook can include a rule parameter indicating that the vehicle cannot stop in an intersection. In turn, the system 500, based on the rule parameter, will penalize stopping in an intersection and thereby not perform a maneuver that requires stopping in an intersection unless needed, where the system 500 will determine a penalty parameter. In some examples, rules of passenger comfort define whether or not a particular passenger within the vehicle has motion sickness and is sensitive to high 'g' forces. In a situation encountered by the vehicle, at least some of the rules may apply to the situation. Rules can have priority. For example, a rule that says, "if the road is a freeway, move to the leftmost lane" can have a lower priority than "if the exit is approaching within a mile, move to the rightmost lane."

For example, by using the penalty parameter, the system 500 makes determinations of violations of rules when a violation of a rule is a requirement. For example, the autonomous vehicle may have no trajectory to take that would not violate one or more rules in the rulebook, and the system 500 can be configured to determine the "best" violating rule (e.g., the trajectory with the lowest penalty and/or the most prioritized rule).

In one or more examples or embodiments, the penalty parameter indicates a soft penalty (e.g., a soft constraint) or a hard penalty (e.g., a hard constraint). A soft penalty may be indicative of the autonomous vehicle minorly entering a crosswalk. A hard penalty may be indicative of the autonomous vehicle passing through a crosswalk when not legal, and/or hitting another agent. In one or more examples or embodiments, the penalty parameter includes a score. The score can be indicative of the severity of the penalty parameter (e.g., severity of the non-compliance of a rule). The system 500, in some examples, selects the trajectory 518 having the penalty parameter with the lowest score, for example, with the most minor violation of a rule. In certain circumstances, a soft penalty may be favorable over a loss of comfort of a user of the autonomous vehicle for otherwise required hard braking events for lower priority rules. For example, it may be better for the autonomous vehicle to slow down in a normal manner and slightly enter an intersection than braking extremely hard and not entering the intersection.

The penalty parameter can be indicative of a single violation and/or continuous violations. For example, the penalty parameter can be indicative of an ingress distance measurement of the autonomous vehicle into an intersection boundary. As an example, the system 500 is configured to apply costs to trajectories of the plurality of trajectories 516 for determination of the trajectory 518.

In one or more examples or embodiments, the system 500 can be configured to determine, based on the sensor data 512, a crosswalk status parameter indicating a status of a crosswalk. The status of a crosswalk can be active (e.g., pedestrians may legally cross) or inactive (e.g., pedestrians may not legally cross). Crosswalks, like vehicle intersections, can vary in structure. For example, crosswalk statuses includes un-signalled and marked crosswalks, un-signalled and inferred crosswalks, and signalled crosswalks. Unsignalled and marked crosswalks can be crosswalks that have clear markings on the road, but no traffic signal to control them. The system 500 can be configured to determine a crosswalk status parameter as active for an un-signalled and marked crosswalk, where pedestrians take precedence but there are clear intersection boundaries. Un-signalled and inferred crosswalks can include pedestrian crossings that are neither marked nor have a signal. The system 500 can be configured to determine a crosswalk status parameter as active for an un-signalled and inferred crosswalk, where pedestrians take precedence but the system 500 is configured to determine the intersection boundary, using sensor data 512, based on linking parallel sidewalk bounds and/or curb depressions. For signaled crosswalks, the system can be configured to determine a crosswalk status parameter as active or inactive based on a traffic light cycle. The system 500 may determine a penalty parameter for an autonomous vehicle being located in an intersection boundary with a crosswalk status of active. The system 500 may determine no penalty parameter for an autonomous vehicle being located in an intersection boundary with a crosswalk status of inactive.

In one or more embodiments or examples, selecting the trajectory 518 of the plurality of trajectories 516 includes selecting the trajectory 518 of the plurality of trajectories 516 indicating either a stopping of the autonomous vehicle prior to the intersection boundary or a travelling of the autonomous vehicle through the intersection boundary. In one or more embodiments or examples, selecting the trajectory 518 of the plurality of trajectories 516 includes selecting the trajectory 518 of the plurality of trajectories 516 indicating a stopping of the autonomous vehicle prior to the intersection boundary. In one or more embodiments or examples, selecting the trajectory 518 of the plurality of trajectories 516 includes selecting the trajectory 518 of the plurality of trajectories 516 indicating a travelling of the autonomous vehicle through the intersection boundary. In other words, the system 500 can be configured to stop the autonomous vehicle prior to an intersection or drive through (e.g., travel through) the intersection. Other trajectories can be selected as well as needed.

In one or more embodiments or examples, selecting the trajectory 518 of the plurality of trajectories 516 includes selecting the trajectory 518 of the plurality of trajectories 516 indicating a refraining of the autonomous vehicle from stopping the autonomous vehicle in the intersection boundary. Advantageously, the system 500 may be configured to reduce intersection gridlock by preventing the autonomous vehicle from stopping in an intersection boundary.

In one or more embodiments or examples, generating the plurality of trajectories 516 includes determining whether the sensor data 512 is indicative of a lane interaction parameter. In one or more embodiments or examples, the lane interaction parameter is indicative of one of: a shared entry, a shared exit, a disjoint entry, and a disjoint exit. In one or more embodiments or examples, selecting the trajectory 518 of the plurality of trajectories 516 includes selecting, based on the lane interaction parameter, the trajectory 518. As an example, the system 500 utilizes lane connector relationships for selecting the trajectory 518. The system 500 can determine, either offline or online, a lane connector pair relationship, such as the lane interaction parameter, indicative of divergent (e.g., shared entry), convergent (e.g., shared exit), or disjoint (e.g., neither divergent nor convergent) lanes. The system 500 can obtain the sensor data 512 and determine if the sensor data 512 is indicative of whether the lane interaction parameter is restricted (e.g., by traffic light red cycle). Further, the system 500 can select a trajectory 518 based on the lane interaction parameter, such as by selecting a trajectory 518 of the autonomous vehicle going straight, the trajectory 518 can leave clearance for converging and disjoint traffic. When the trajectory 518 is a turning trajectory, the system 500 can select a trajectory 518 which only leaves clearance for disjoint traffic.

Mathematically, this may be expressed for example as:

bool
  isIntersectionGridlock=$V$_ego<low_speed_threshold
  && ((ego_going_straight && ego_footprint_int-
  ersects_unrestricted_non_divergent_lane_con-
  nector) ∥ego_footprint_intersects_unrestricted_
  disjoint_lane_connector).

As disclosed above, V_ego: The ego vehicle's velocity; low_speed_threshold: a low-speed threshold (zero or near zero) used to determine if the ego vehicle has stopped; ego_going_straight: true if the corresponding route lane connector through the intersection is of "straight" turn type; ego_footprint_intersects_unrestricted_non_divergent_lane_connector: if the footprint intersects a lane connector that does not share any entry lane along ego's route through the intersection and the lane connector is unsignalled or the corresponding traffic light is in a status other than steady red; and ego_footprint_intersects_unrestricted_disjoint_lane_connector: if the footprint intersects a lane connector that doesn't share either an entry or exit lane along ego's route through the intersection and the lane connector is unsignalled or the corresponding traffic light is in a status other than steady red.

As an example, the system 500 can be used for gridlock prevention. First, the system 500 can define an applicable "keep clear" area, such as indicated by the intersection parameter 510. The system 500 may obtain the intersection parameter 510 based on sensor data 512 (such as ego path and/or road markings), or may be obtained offline from a database (such as database 410 of FIG. 4) and/or a storage device (such as storage device 308 of FIG. 3). It can be noted that even with a marked region intersection parameter 510, in some instances the system 500 may not make determinations about the intersection, such as for inactive crosswalks. In one or more examples or embodiments, the system 500 is configured to determine and apply at least one constraint 514 for generation of a plurality of trajectories 516. The system 500 can utilize sensor data 512 for obstacle detection and/or traffic light status or cycle timing. The system 500 can use a penalty parameter and/or the at least one constraint 514 to dictate whether clearing the intersection is possible. The at least one constraint 514 can be expressed in the V-S domain (e.g. velocity-space domain, such as to slow the autonomous vehicle to stop before intersection, or to ensure minimal velocity over the intersection), or can be expressed in the T-S domain (e.g. time-space domain, such as certain timings when path progress interval through the intersection is disallowed). Advantageously, the system 500 has the benefit of leveraging prediction, such as following a vehicle (e.g., agent) that is predicted to stop inside the intersection (not yet stopped) and responding to amber traffic light.

The system 500 can be configured to apply costs for trajectory scoring, where a trajectory 518 is a sequence of time-stamped poses. An example implementation can be expressed as binary violation, e.g.:

bool isGridlock=$V$_ego<low_speed_threshold &&
  footprint_intersects_keep_clear_area.

The above equation is illustrative of a binary violation cost. Assuming two trajectories A and B, where A has isGridlock=true, and B has isGridklock=false. In one or more embodiments or examples, if there is no other cost being considered for these two trajectories, B is a "better" option than A.

Figure 6:
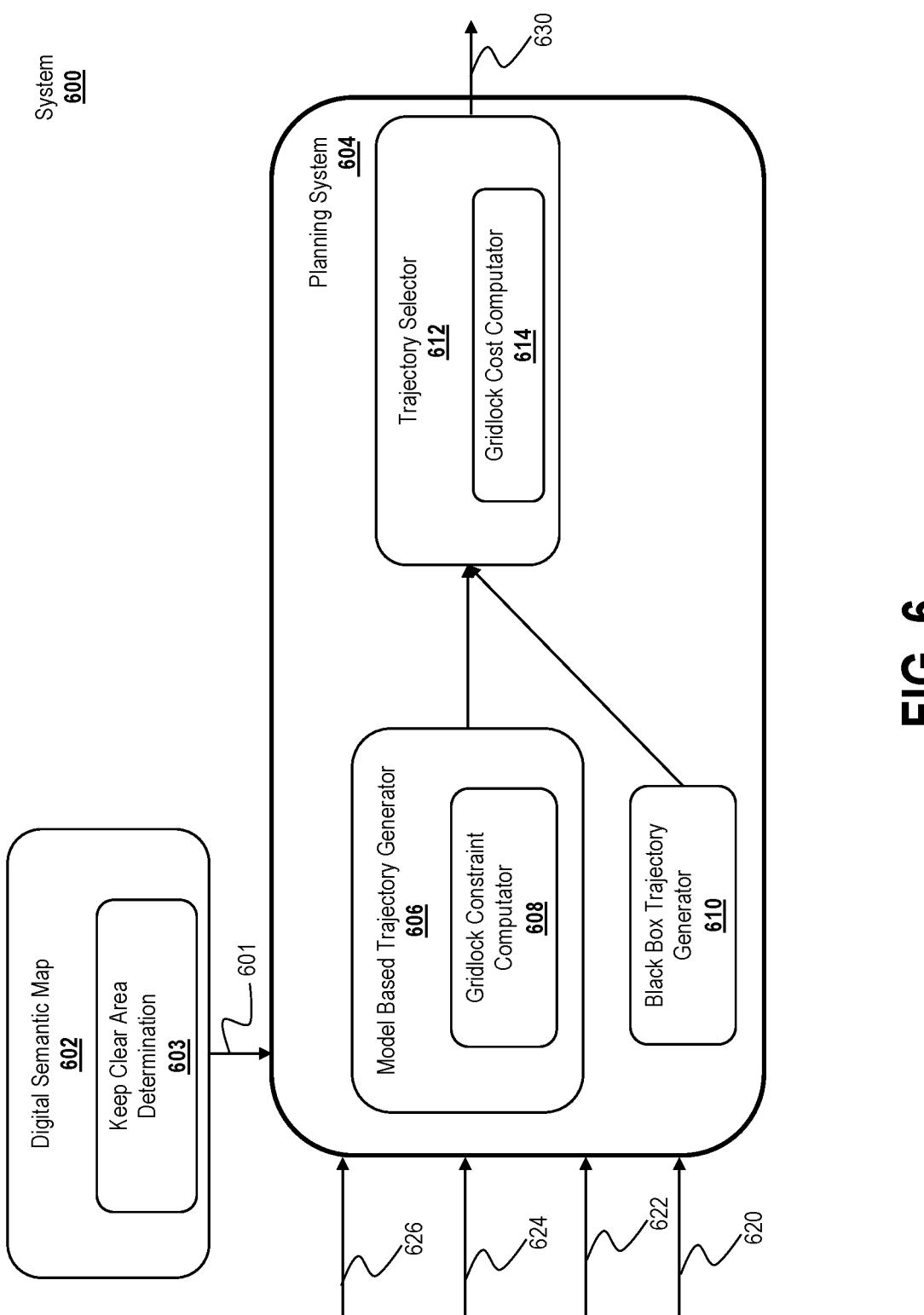
FIG. 6 is a diagram of an example implementation of a process for gridlock prevention.

FIG. 6 is a diagram of an example implementation of a process for gridlock prevention. As shown, the system 600 (such as similar to system 500 of FIG. 5) can include a planning system 604 (similar to planning system 504 of FIG. 5 and planning system 404 of FIG. 4). The planning system 604 can be configured to receive one or more inputs.

As shown in FIG. 6, the planning system 604 can receive an intersection parameter 601. The intersection parameter 601 may be based on a digital semantic map 602, such as stored in a database and/or obtained via sensor data. The digital semantic map 602, for example, is a map representing certain areas in an environment as being associated with certain conditions (e.g., where pedestrians are located, where vehicles are located, etc., where parking is allowed, intersections, keep clear areas). As an example, the digital semantic map 602 is a map representing drivable areas along for an autonomous vehicle with defined keep clear areas, such as where the autonomous vehicle is not allowed to stop. The intersection parameter 601 may be based on a "keep clear area" determination 603, such as an intersection.

Further, the planning system 604 can receive one or more of: localization data 626 indicative of a location of the autonomous vehicle, mission route and/or goal data 624 indicative of a planned route for the autonomous vehicle, obstacle detection and prediction data 622 indicative of obstacles and agents in the environment of the autonomous vehicle, and traffic light detection data 620 indicative of the status of traffic lights in the environment.

The system 600 can include a model based trajectory generator 606 configured to determine a plurality of trajectories, such as those discussed with respect to FIG. 5. The model based trajectory generator 606 can include a gridlock constraint computator 608, which can be used to determine one or more constraints, such as constraint 514 of FIG. to minimize gridlock in an intersection. The planning system 604 may further utilize a black box trajectory generator 610, which may be a neural network and/or machine learning system for input into the selection of a particular trajectory. The black box trajectory generator 610 can take different input trajectories as input and output a selected "best" trajectory.

The system 600 can further include a trajectory selector (e.g., a trajectory scorer) 612 associated with the planning system 604. The trajectory selector 612 can receive input from the model based trajectory generator 606 and/or the black box trajectory generator 610. The trajectory selector 612 can use a gridlock cost computator 614 for selection of a trajectory 630 (e.g., a command trajectory), such as trajectory 518 of FIG. The gridlock cost computator 614 can determine different costs, such as discussed in FIG. 5, associated with the plurality of trajectories provided by the trajectory selector 612. In one or more embodiments or examples, costs are based on the rules included in the rulebook.

Figure 7A:
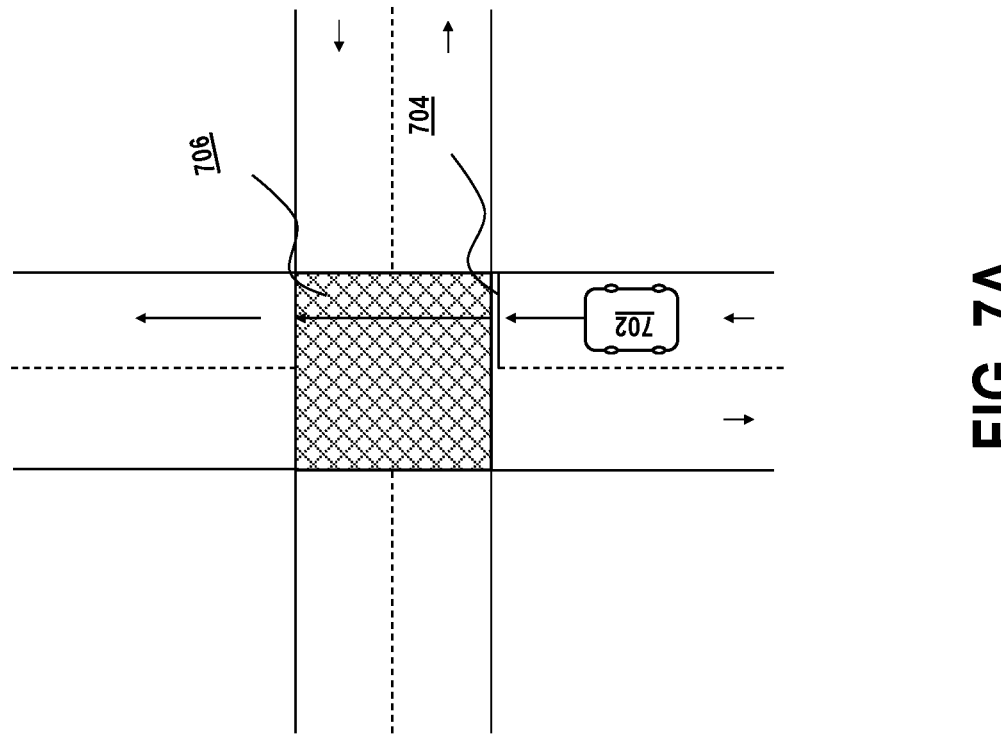
FIGS. 7A-7F are diagrams of an example implementation of a process for gridlock prevention.
Figure 7C:
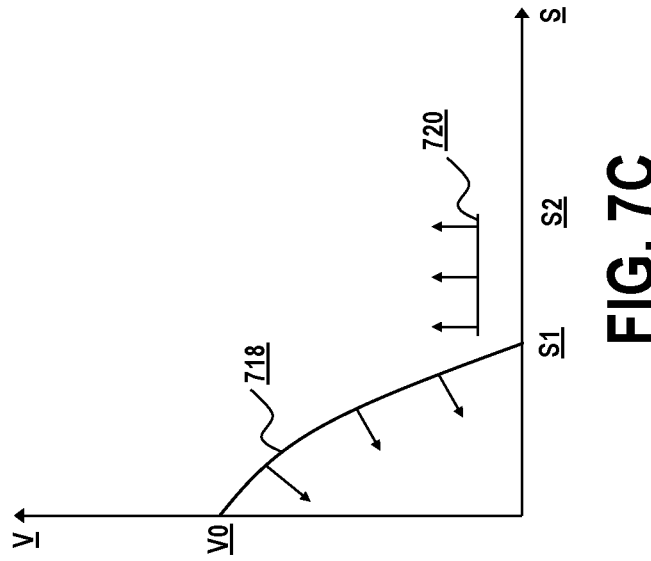
Figure 7B:
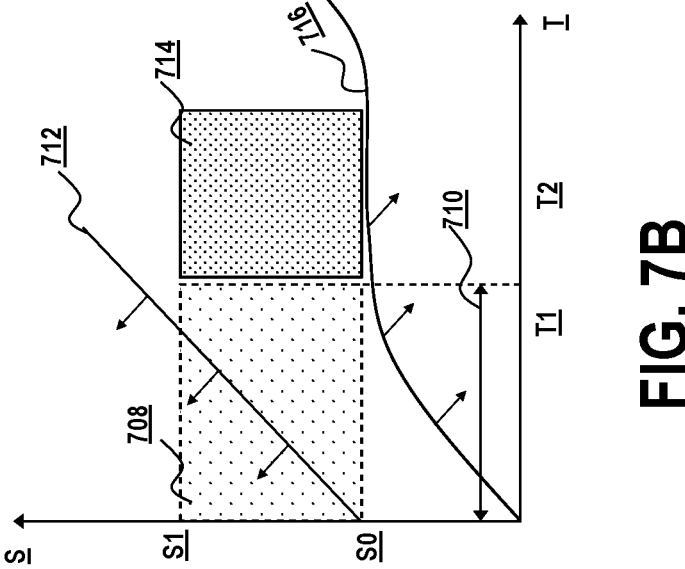
Figure 7D:
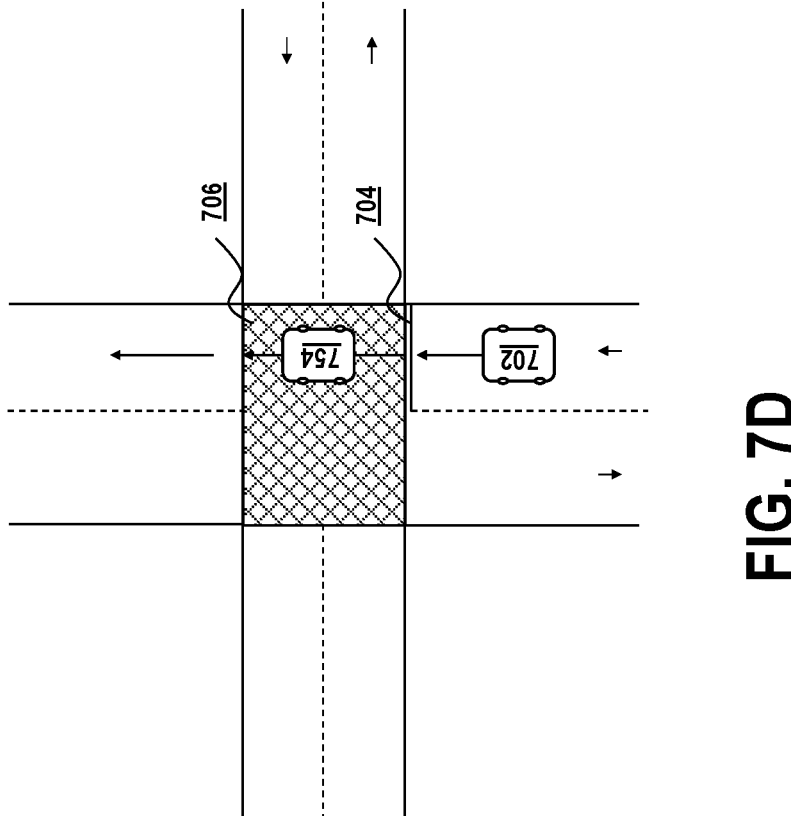
Figure 7F:
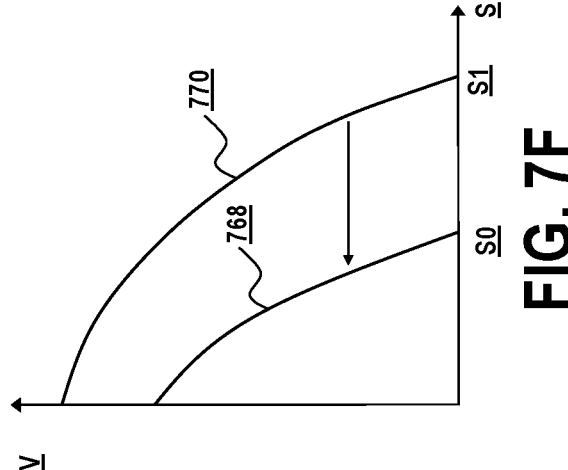
Figure 7E:
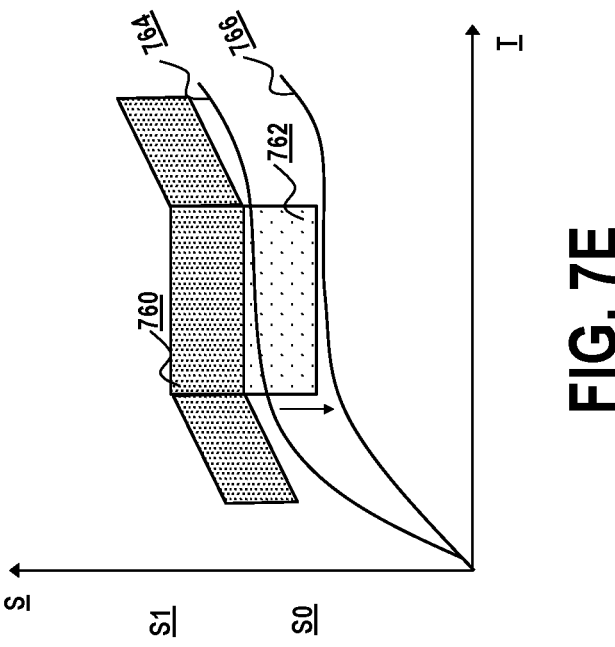

FIGS. 7A-7F are diagrams of example situations where a process for gridlock prevention, such as using system 500, 600, is applied. FIGS. 7A-7C illustrate a first situation and FIGS. 7D-7F illustrate a second situation. Specifically, FIG. 7A illustrates a yellow light example for autonomous vehicle 702 including system 500. As shown, the autonomous vehicle 702 is approaching an intersection 706 having an intersection boundary 704. The autonomous vehicle 702 obtains sensor data indicative of a yellow light. FIG. 7B illustrates a S-T analysis and FIG. 7C illustrates a V-S analysis.

As discussed, the system of the autonomous vehicle 702 determines a plurality of trajectories (e.g., homotopy options), two of which are shown in FIG. 7B as first trajectory 712 (passing completely through the intersection) and second trajectory 716 (stopping at intersection boundary 704). Area 708 is indicative of a yellow light (so there is no constraint) having yellow light countdown 710, whereas area 714 is indicative of a red light (a constraint that the vehicle cannot stop in the intersection or enter the intersection. As shown in FIG. 7C, based on a V-S analysis, the autonomous vehicle 702 may stop 718 at the intersection boundary 704 or pass through 720 the intersection.

Regarding passing through the intersection, in S-T space, this is a minimal path progress constraint before the exit of the keep clear area is impeded. In V-S space, this is a minimum speed constraint through the keep clear area. Regarding stopping before the intersection boundary 704 (e.g., if passing through the intersection is not possible), in V-S space, this is a zero speed constraint imposed just prior to the keep clear area, conditionally imposed when there are otherwise constraints resulting in a stop inside the keep clear area. In S-T space, this is a maximal path progress constraint until the exit of the keep clear area becomes free.

FIGS. 7D-7F illustrate a similar scenario but with a leading agent (e.g., vehicle) 754 impeding progress through the intersection 706. The system 500 can be configured to predict that the leading agent 754 will come to a stop 760 (horizontal on S-T plot of FIG. 7E), and the corresponding stopping point for ego would then be within the keep clear area 762 as indicated by line 764, the system 500 can be configured to enlarge the S-T obstacle to force stop early (prior to keep clear area) 766, or the system 500 can add the V-S constraint to stop early 768 rather than stop directly behind 770 the leading agent 754. In this scenario, there is no option to pass ahead of the leading car, so max speed/ progress constraints are adjusted. However, when the system 500 predicts that the leading agent 754 was not predicted to stop 760, the autonomous vehicle 702 can pass through keep clear area following closely.

Figure 8A:
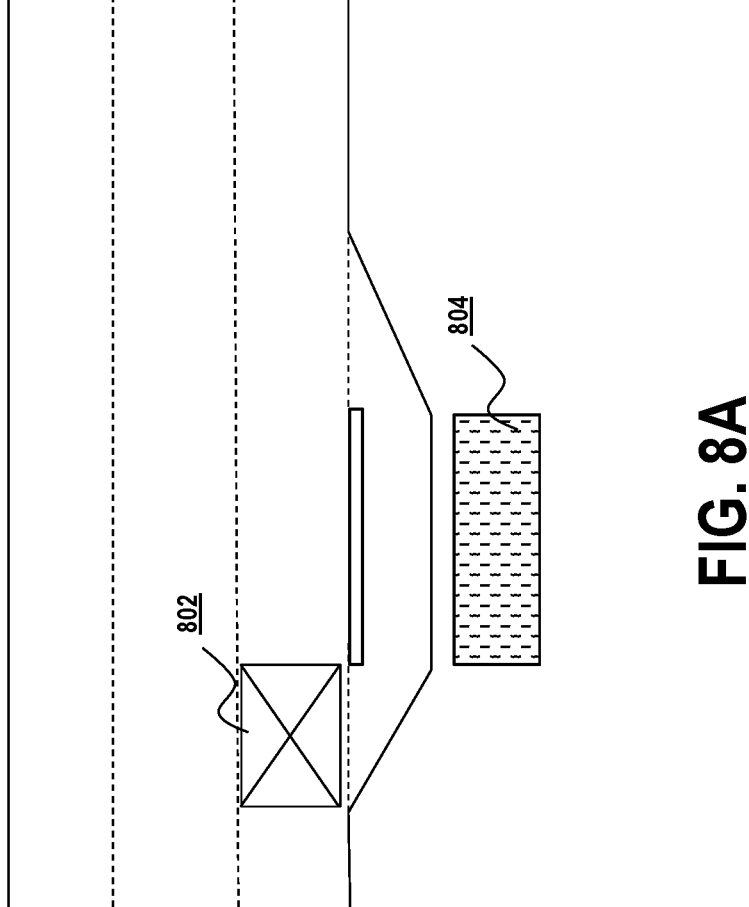
FIGS. 8A-8B are diagrams of an example implementation of a process for gridlock prevention.
Figure 8B:
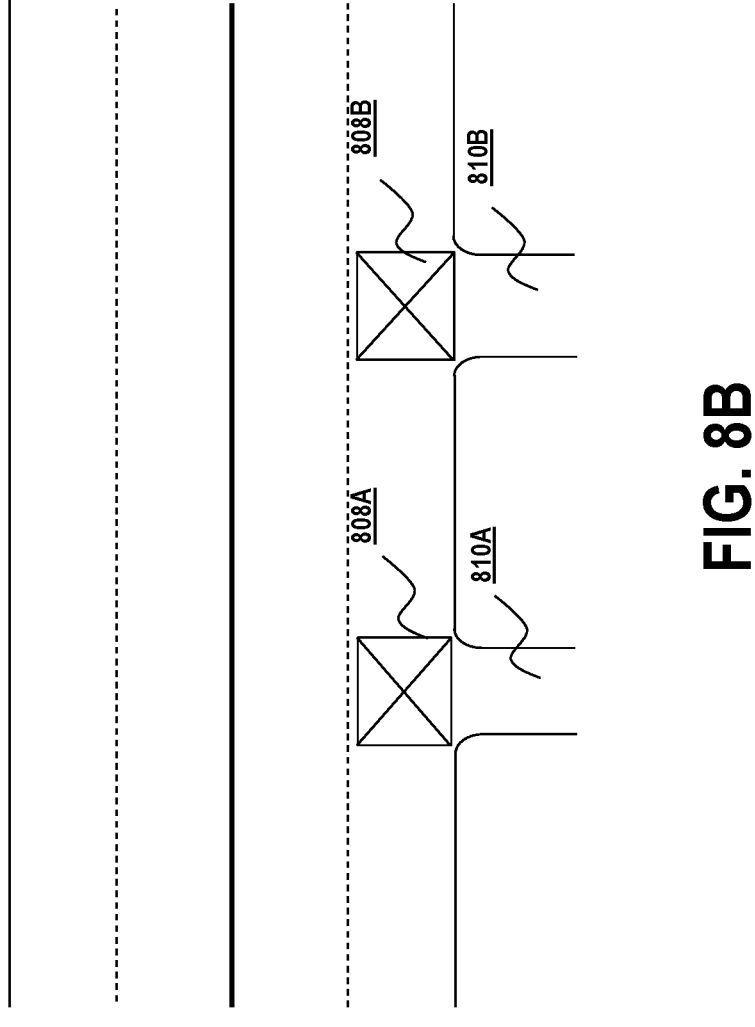

FIGS. 8A-8B are diagrams of an example implementation of a process for gridlock prevention of different types of intersections with FIG. 8A illustrating a bus entrance (e.g., bus bay) and FIG. 8B illustrating a driveway entrance (e.g., a courtesy rule situation). In FIG. 8A, there is a bus stop 804 having a yellow box 802 keep clear region. This example is a convergent lane relationship only, and the keep clear area only applies to straight traffic. FIG. 8B illustrates a plurality of driveways 810A and 810B having unmarked entrances 808A, 808B, respectively. Driveways are rarely marked, but FIG. 8B illustrates an example intersection parameter determination that follows a courtesy rules of the road, which essentially acts as marked intersections.

Figure 9A:
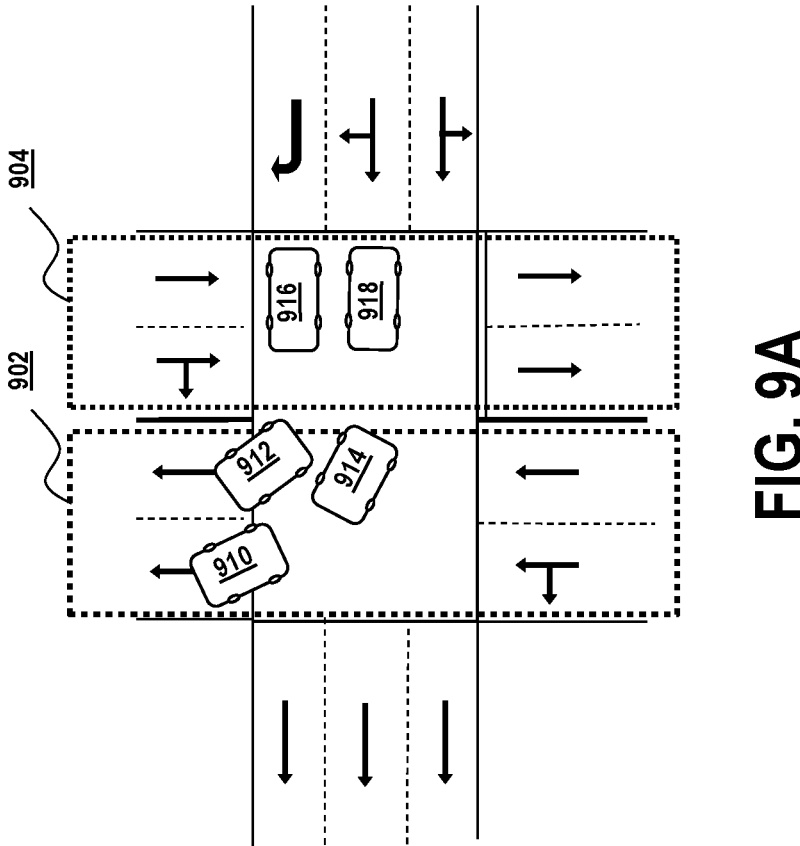
FIGS. 9A-9C are diagrams of an example implementation of a process for gridlock prevention.
Figure 9B:
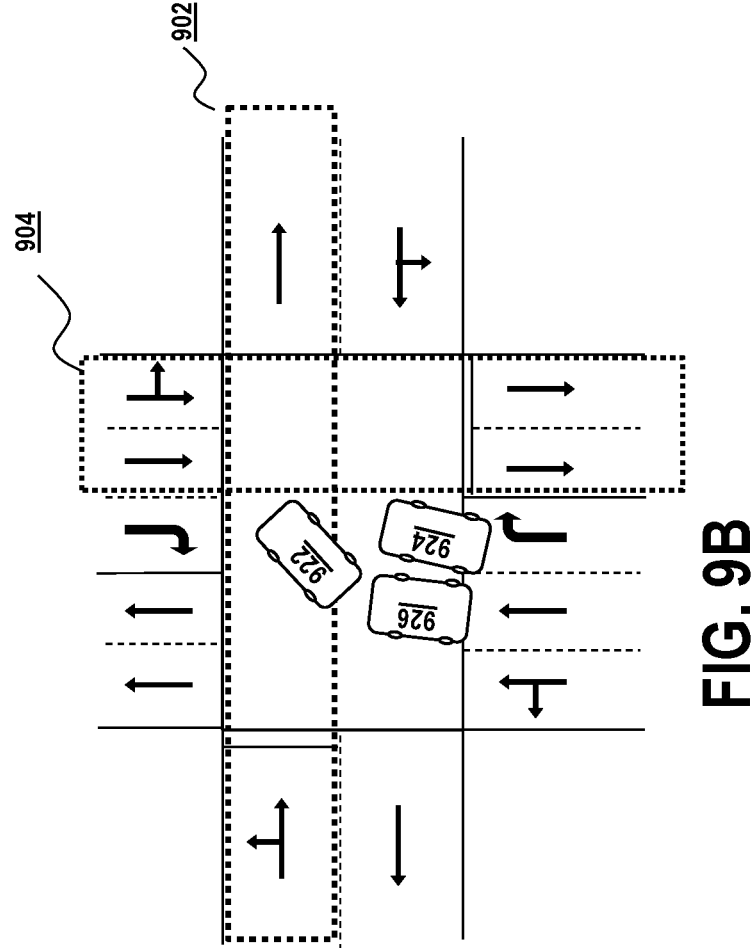
Figure 9C:
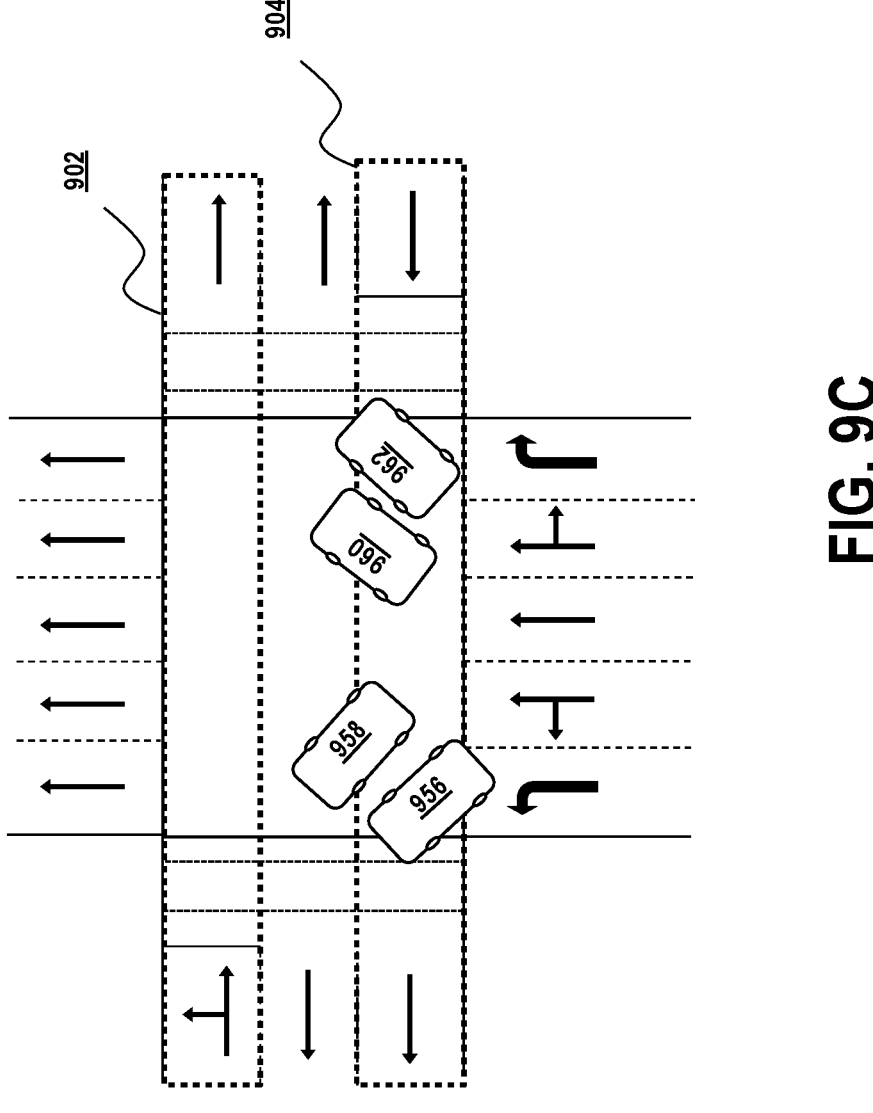

FIGS. 9A-9C are diagrams of an example implementation of a process for gridlock prevention. Specifically, FIGS. 9A-9C illustrate different potential lane intersection parameters indicative of shared entry, shared exit, disjoint entry, or disjoint exit. In FIG. 9A, vehicles 910, 912, and 914 would be in a lane intersection parameter indicative of a convergent lane 902 whereas vehicles 916 and 918 would be in a lane intersection parameter indicative of a disjoint lane 904. In FIG. 9B, vehicles 922, 924, and 926 would be entering a lane with a lane intersection parameter indicative of a convergent lane 902, whereas the cross lane would have a lane intersection parameter indicative of a disjoint lane 904.

In FIG. 9C, vehicles 956 and 958 would be entering a lane having a lane intersection parameter indicative of a convergent lane 902, whereas vehicles 960 and 962 would be entering a lane having a lane intersection parameter indicative of a disjoint lane 904. It can be acceptable to block a convergent lane if turning but it would be a penalty to stop in a disjoint lane.

Referring now to FIG. 10, illustrated is a flowchart of a method or process 1000 for gridlock prevention, such as for operating and/or controlling an AV. The method can be performed by a system disclosed herein, such as an AV compute 400 of FIG. 4, AV compute 202f of FIG. 2, or AV compute 540 of FIG. 5, a vehicle 102, 200, of FIGS. 1 and 2, a device 300 of FIG. 3, and/or systems 500, 600 and implementations of FIGS. 5, 6, 7A-7F, 8A-8B, and 9A-9C. The system disclosed can include at least one processor which can be configured to carry out one or more of the operations of method 1000. The method 1000 can be performed (e.g., completely, partially, and/or the like) by another device or group of devices separate from or including system disclosed herein.

In one or more embodiments or examples, the method 1000 includes obtaining, at step 1002, using at least one processor, sensor data associated with an environment in which an autonomous vehicle is operating. In one or more embodiments or examples, the sensor data is generated by at least one sensor of an autonomous vehicle operating in the environment. In one or more embodiments or examples, the method 100 includes obtaining, at step 1004, using the at least one processor, an intersection parameter indicative of an intersection boundary for an intersection located in the environment. In one or more embodiments or examples, the method 1000 includes determining, at step 1006, using the at least one processor, at least one constraint based on a state of the autonomous vehicle. In one or more embodiments or examples, the at least one constraint minimizes a likelihood that operation of the autonomous vehicle results in a gridlock state of the interaction. In one or more embodiments or examples, the method 1000 includes generating, at step 1008, using the at least one processor, a plurality of trajectories for operation of the autonomous vehicle. In one or more embodiments or examples, the method 1000 includes selecting, at step 1010, using the at least one processor, based on the at least one constraint, a trajectory of the plurality of trajectories. In one or more embodiments or examples, the trajectory minimizes the likelihood that operation of the autonomous vehicle results in the gridlock state. In one or more embodiments or examples, the method 1000 includes providing, at step 1012, using the at least one processor, data associated with the trajectory. In one or more embodiments or examples, the data associated with the trajectory is configured to cause operation of the autonomous vehicle along the trajectory. The intersection boundary can be an unmarked intersection, cross road, yellow box, box junction, keep clear area, etc. The obtaining, at step 1004, of the intersection parameter can be performed offline or online, such as based on sensor data. The state of the autonomous vehicle can include, for example, speed and/or time to exit an intersection.

In one or more embodiments or examples, determining, at step 1006, the at least one constraint based on the state of the autonomous vehicle includes determining a longitudinal progress constraint and/or a velocity constraint. The longitudinal progress constraint can include a passing through an area at a particular time, and the velocity constraint can include maintaining a speed above 0 in an intersection. In one or more embodiments or examples, the method 1000 includes determining, based on the sensor data and a rule of the autonomous vehicle, a penalty parameter indicative of a violation of the rule. In one or more embodiments or examples, selecting, at step 1010, the trajectory of the plurality of trajectories includes selecting, based on the penalty parameter, the trajectory of the plurality of trajectories. The penalty parameter can be indicative of soft penalties and/or hard penalties, and can further include a score.

In one or more embodiments or examples, generating, at step 1008, the plurality of trajectories includes determining, based on the sensor data, an agent in the environment. In one or more embodiments or examples, generating, at step 1008, the plurality of trajectories includes predicting movement of the agent. In one or more embodiments or examples, generating, at step 1008, the plurality of trajectories includes generating, based on the movement of the agent, the plurality of trajectories.

In one or more embodiments or examples, the sensor data is indicative of one or more of: traffic light status and crosswalk status. The statuses can include active, inactive and inferred statuses. In one or more embodiments or examples, the intersection parameter is indicative of one or more of: a bus stop, a cross walk, a vehicular intersection, an area associated with a vehicle intersection, and a driveway. An area associated with a vehicle intersection can include a turn parameter indicative of a turn delineation in the intersection boundary and/or a turn pocket.

In one or more embodiments or examples, selecting, at step 1010, the trajectory of the plurality of trajectories includes selecting the trajectory of the plurality of trajectories indicating a stopping of the autonomous vehicle prior to the intersection boundary. In one or more embodiments or examples, selecting, at step 1010, the trajectory of the plurality of trajectories includes selecting the trajectory of the plurality of trajectories indicating a travelling of the autonomous vehicle through the intersection boundary. In one or more embodiments or examples, generating, at step 1008, the plurality of trajectories includes determining whether the sensor data is indicative of a lane interaction parameter. In one or more embodiments or examples, the lane interaction parameter is indicative of one of: a shared entry, a shared exit, a disjoint entry, and a disjoint exit. In one or more embodiments or examples, selecting, at step 1010, the trajectory of the plurality of trajectories includes selecting, based on the lane interaction parameter, the trajectory.

In one or more embodiments or examples, selecting, at step 1010, the trajectory of the plurality of trajectories includes selecting the trajectory of the plurality of trajectories indicating a refraining of the autonomous vehicle from stopping the autonomous vehicle in the intersection boundary. In one or more embodiments or examples, obtaining, at step 1004, the intersection parameter includes obtaining, based on the sensor data, the intersection parameter. In one or more embodiments or examples, the method 1000 includes operating, using the at least one processor, based on the data associated with the trajectory, the autonomous vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A method comprising:

obtaining, using at least one processor, sensor data associated with an environment in which an autonomous vehicle is operating, the sensor data generated by at least one sensor of an autonomous vehicle operating in the environment;

obtaining, using the at least one processor, an intersection parameter indicative of an intersection boundary for an intersection located in the environment;

determining, using the at least one processor, at least one constraint based on a state of the autonomous vehicle, the at least one constraint minimizing a likelihood that operation of the autonomous vehicle results in a gridlock state of the intersection;

generating, using the at least one processor, a plurality of trajectories for operation of the autonomous vehicle;

selecting, using the at least one processor, based on the at least one constraint, a trajectory of the plurality of trajectories, the trajectory minimizing the likelihood that operation of the autonomous vehicle results in the gridlock state; and providing, using the at least one processor, data associated with the trajectory, the data associated with the trajectory configured to cause operation of the autonomous vehicle along the trajectory.

Item 2. The method of item 1, wherein determining the at least one constraint based on the state of the autonomous vehicle comprises:

determining a longitudinal progress constraint and/or a velocity constraint.

Item 3. The method of any one of the preceding items, further comprising:

determining, based on the sensor data and a rule of the autonomous vehicle, a penalty parameter indicative of a violation of the rule;

wherein selecting the trajectory of the plurality of trajectories comprises selecting, based on the penalty parameter, the trajectory of the plurality of trajectories.

Item 4. The method of any one of the preceding items, wherein generating the plurality of trajectories comprises:

determining, based on the sensor data, an agent in the environment;

predicting movement of the agent; and generating, based on the movement of the agent, the plurality of trajectories.

Item 5. The method of any one of the preceding items, wherein the sensor data is indicative of one or more of: traffic light status and crosswalk status.

Item 6. The method of any one of the preceding items, wherein the intersection parameter is indicative of one or more of: a bus stop, a cross walk, a vehicular intersection, an area associated with a vehicle intersection, and a driveway.

Item 7. The method of any one of the preceding items, wherein selecting the trajectory of the plurality of trajectories comprises:

selecting the trajectory of the plurality of trajectories indicating a stopping of the autonomous vehicle prior to the intersection boundary; or selecting the trajectory of the plurality of trajectories indicating a travelling of the autonomous vehicle through the intersection boundary.

Item 8. The method of any one of the preceding items, wherein generating the plurality of trajectories comprises:

determining whether the sensor data is indicative of a lane interaction parameter, wherein the lane interaction parameter is indicative of one of: a shared entry, a shared exit, a disjoint entry, and a disjoint exit;

wherein selecting the trajectory of the plurality of trajectories comprises selecting, based on the lane interaction parameter, the trajectory.

Item 9. The method of any one of the preceding items, where selecting the trajectory of the plurality of trajectories comprises:

selecting the trajectory of the plurality of trajectories indicating a refraining of the autonomous vehicle from stopping the autonomous vehicle in the intersection boundary.

Item 10. The method of any one of the preceding items, wherein obtaining the intersection parameter comprises:

obtaining, based on the sensor data, the intersection parameter.

Item 11. The method of any one of the preceding items, the method further comprising: operating, using the at least one processor, based on the data associated with the trajectory, the autonomous vehicle.

Item 12. A non-transitory computer readable medium comprising instructions stored thereon that, when executed by at least one processor, cause the at least one processor to carry out operations comprising:

obtaining sensor data associated with an environment in which an autonomous vehicle is operating, the sensor data generated by at least one sensor of an autonomous vehicle operating in the environment;

obtaining an intersection parameter indicative of an intersection boundary for an intersection located in the environment;

determining, using the at least one processor, at least one constraint based on a state of the autonomous vehicle, the at least one constraint minimizing a likelihood that operation of the autonomous vehicle results in a gridlock state of the intersection;

generating a plurality of trajectories for operation of the autonomous vehicle;

selecting based on the at least one constraint, a trajectory of the plurality of trajectories, the trajectory minimizing the likelihood that operation of the autonomous vehicle results in a gridlock state; and providing data associated with the trajectory, the data associated with the trajectory configured to cause operation of the autonomous vehicle along the trajectory.

Item 13. The non-transitory computer readable medium of item 12, wherein determining the at least one constraint based on the state of the autonomous vehicle comprises:

determining a longitudinal progress constraint and/or a velocity constraint.

Item 14. The non-transitory computer readable medium of items 12-13, further comprising:

determining, based on the sensor data and a rule of the autonomous vehicle, a penalty parameter indicative of a violation of the rule;

wherein selecting the trajectory of the plurality of trajectories comprises selecting, based on the penalty parameter, the trajectory of the plurality of trajectories.

Item 15. The non-transitory computer readable medium of items 12-14, wherein generating the plurality of trajectories comprises:

determining, based on the sensor data, an agent in the environment;

predicting movement of the agent; and generating, based on the movement of the agent, the plurality of trajectories.

Item 16. The non-transitory computer readable medium of items 12-15, wherein the sensor data is indicative of one or more of: traffic light status and crosswalk status.

Item 17. The non-transitory computer readable medium of items 12-16, wherein the intersection parameter is indicative of one or more of: a bus stop, a cross walk, a vehicular intersection, an area associated with a vehicle intersection, and a driveway.

Item 18. The non-transitory computer readable medium of items 12-17, wherein selecting the trajectory of the plurality of trajectories comprises:

selecting the trajectory of the plurality of trajectories indicating a stopping of the autonomous vehicle prior to the intersection boundary; or selecting the trajectory of the plurality of trajectories indicating a travelling of the autonomous vehicle through the intersection boundary.

Item 19. The non-transitory computer readable medium of items 12-18, wherein generating the plurality of trajectories comprises:

determining whether the sensor data is indicative of a lane interaction parameter, wherein the lane interaction parameter is indicative of one of: a shared entry, a shared exit, a disjoint entry, and a disjoint exit;

wherein selecting the trajectory of the plurality of trajectories comprises selecting, based on the lane interaction parameter, the trajectory.

Item 20. The non-transitory computer readable medium of items 12-19, where selecting the trajectory of the plurality of trajectories comprises:

selecting the trajectory of the plurality of trajectories indicating a refraining of the autonomous vehicle from stopping the autonomous vehicle in the intersection boundary.

Item 21. The non-transitory computer readable medium of items 12-20, wherein obtaining the intersection parameter comprises:

obtaining, based on the sensor data, the intersection parameter.

Item 22. The non-transitory computer readable medium of items 12-21, further comprising:

operating, using the at least one processor, based on the data associated with the trajectory, the autonomous vehicle.

Item 23. A system, comprising at least one processor, and
at least one memory storing instructions thereon that,
when executed by the at least one processor, cause the
at least one processor to perform operations compris-
ing:
obtaining sensor data associated with an environment in
which an autonomous vehicle is operating, the sensor
data generated by at least one sensor of an autonomous
vehicle operating in the environment;
obtaining an intersection parameter indicative of an inter-
section boundary for an intersection located in the
environment;
determining, using the at least one processor, at least one
constraint based on a state of the autonomous vehicle,
the at least one constraint minimizing a likelihood that
operation of the autonomous vehicle results in a grid-
lock state of the intersection;
generating a plurality of trajectories for operation of the
autonomous vehicle;
selecting based on the at least one constraint, a trajectory
of the plurality of trajectories, the trajectory minimiz-
ing the likelihood that operation of the autonomous
vehicle results in a gridlock state; and
providing data associated with the trajectory, the data
associated with the trajectory configured to cause
operation of the autonomous vehicle along the trajec-
tory.
Item 24. The system of item 23, wherein determining the
at least one constraint based on the state of the autono-
mous vehicle comprises:
determining a longitudinal progress constraint and/or a
velocity constraint.
Item 25. The system of items 23-24, further comprising:
determining, based on the sensor data and a rule of the
autonomous vehicle, a penalty parameter indicative of
a violation of the rule;
wherein selecting the trajectory of the plurality of trajec-
tories comprises selecting, based on the penalty param-
eter, the trajectory of the plurality of trajectories.
Item 26. The system of items 23-25, wherein generating
the plurality of trajectories comprises:
determining, based on the sensor data, an agent in the
environment;
predicting movement of the agent; and
generating, based on the movement of the agent, the
plurality of trajectories.
Item 27. The system of items 23-26, wherein the sensor
data is indicative of one or more of: traffic light status
and crosswalk status.
Item 28. The system of items 23-27, wherein the inter-
section parameter is indicative of one or more of: a bus
stop, a cross walk, a vehicular intersection, an area
associated with a vehicle intersection, and a driveway.
Item 29. The system of items 23-28, wherein selecting the
trajectory of the plurality of trajectories comprises:
selecting the trajectory of the plurality of trajectories
indicating a stopping of the autonomous vehicle prior
to the intersection boundary; or
selecting the trajectory of the plurality of trajectories
indicating a travelling of the autonomous vehicle
through the intersection boundary.
Item 30. The system of items 23-29, wherein generating
the plurality of trajectories comprises:
determining whether the sensor data is indicative of a lane
interaction parameter, wherein the lane interaction
parameter is indicative of one or more of: a shared
entry, a shared exit, a disjoint entry, and a disjoint exit;

wherein selecting the trajectory of the plurality of trajec-
tories comprises selecting, based on the lane interaction
parameter, the trajectory.
Item 31. The system of items 23-30, where selecting the
trajectory of the plurality of trajectories comprises:
selecting the trajectory of the plurality of trajectories
indicating a refraining of the autonomous vehicle from
stopping the autonomous vehicle in the intersection
boundary.
Item 32. The system of items 23-31, wherein obtaining the
intersection parameter comprises:
obtaining, based on the sensor data, the intersection
parameter.
Item 33. The system of items 23-32, wherein the at least
one memory stores instructions that, when executed by
the at least one processor, cause the at least one
processor to perform operations comprising operating,
based on the data associated with the trajectory, the
autonomous vehicle.
What is claimed is:
1. A method comprising:
obtaining, using at least one processor, sensor data asso-
ciated with an environment in which an autonomous
vehicle is operating, the sensor data generated by at
least one sensor of an autonomous vehicle operating in
the environment;
obtaining, using the at least one processor, an intersection
parameter indicative of an intersection boundary for an
intersection and a crosswalk located in the environ-
ment;
determining, using the at least one processor, a traffic light
status based at least in part on the sensor data;
determining, using the at least one processor, at least one
longitudinal progress constraint based on a state of the
autonomous vehicle and a velocity constraint, wherein
the at least one longitudinal progress constraint indi-
cates that the autonomous vehicle is to pass through the
intersection within a time threshold, wherein the veloc-
ity constraint indicates that the autonomous vehicle is
to maintain a velocity of greater than zero through the
intersection wherein the time threshold is based at least
in part on the traffic light status;
generating, using the at least one processor, a plurality of
trajectories for operation of the autonomous vehicle;
determining a first penalty parameter indicative of a first
violation of the at least one longitudinal progress
constraint and a first violation of the velocity constraint
with respect to the crosswalk, wherein the first penalty
parameter has an associated penalty cost;
determining a second penalty parameter indicative of a
second violation of the at least one longitudinal prog-
ress constraint and a second violation of the velocity
constraint with respect to the intersection, wherein the
second penalty parameter has a higher penalty cost than
the first penalty parameter;
prioritizing the plurality of trajectories based on a plural-
ity of penalty parameters,
wherein the plurality of penalty parameters comprises
the first penalty parameter and the second penalty
parameter,
wherein the first penalty parameter is assigned to a first
trajectory of the plurality of trajectories and the
second penalty parameter is assigned to a second
trajectory of the plurality of trajectories,
wherein the first trajectory is prioritized above the
second trajectory based on the second penalty
parameter having the higher penalty cost than the first penalty parameter, wherein prioritizing the first trajectory above the second trajectory increases a likelihood that operation of the autonomous vehicle violates the velocity constraint with respect to the crosswalk and does not violate the velocity constraint with respect to the intersection;

selecting, using the at least one processor, a trajectory of the plurality of trajectories using the plurality of penalty parameters assigned to the plurality of trajectories; and causing, using the at least one processor, the autonomous vehicle to navigate along the selected trajectory.

2. The method of claim 1, wherein generating the plurality of trajectories comprises:

determining, based on the sensor data, an agent in the environment;

predicting movement of the agent; and generating, based on the movement of the agent, the plurality of trajectories.

3. The method of claim 1, wherein the sensor data is indicative of one or more of: traffic light status and crosswalk status.

4. The method of claim 1, wherein selecting the trajectory of the plurality of trajectories comprises:

selecting the trajectory of the plurality of trajectories indicating a stopping of the autonomous vehicle prior to the intersection boundary.

5. The method of claim 1, wherein generating the plurality of trajectories comprises:

determining whether the sensor data is indicative of a lane interaction parameter, wherein the lane interaction parameter is indicative of one of: a shared entry, a shared exit, a disjoint entry, and a disjoint exit, wherein selecting the trajectory of the plurality of trajectories comprises selecting, based on the lane interaction parameter, the trajectory.

6. The method of claim 1, wherein obtaining the intersection parameter comprises:

obtaining, based on the sensor data, the intersection parameter.

7. A non-transitory computer readable medium comprising instructions stored thereon that, when executed by at least one processor, cause the at least one processor to carry out operations comprising:

obtaining sensor data associated with an environment in which an autonomous vehicle is operating, the sensor data generated by at least one sensor of an autonomous vehicle operating in the environment;

obtaining an intersection parameter indicative of an intersection boundary for an intersection and a crosswalk located in the environment;

determining a traffic light status based at least in part on the sensor data;

determining at least one longitudinal progress constraint based on a state of the autonomous vehicle and a velocity constraint, wherein the at least one longitudinal progress constraint indicates that the autonomous vehicle is to pass through the intersection within a time threshold, wherein the velocity constraint indicates that the autonomous vehicle is to maintain a velocity of greater than zero through the intersection, wherein the time threshold is based at least in part on the traffic light status;

generating a plurality of trajectories for operation of the autonomous vehicle;

determining a first penalty parameter indicative of a first violation of the at least one longitudinal progress constraint and a first violation of the velocity constraint with respect to the crosswalk, wherein the first penalty parameter has an associated penalty cost;

determining a second penalty parameter indicative of a second violation of the at least one longitudinal progress constraint and a second violation of the velocity constraint with respect to the intersection, wherein the second penalty parameter has a higher penalty cost than the first penalty parameter;

prioritizing the plurality of trajectories based on a plurality of penalty parameters, wherein the plurality of penalty parameters comprises the first penalty parameter and the second penalty parameter, wherein the first penalty parameter is assigned to a first trajectory of the plurality of trajectories and the second penalty parameter is assigned to a second trajectory of the plurality of trajectories, wherein the first trajectory is prioritized above the second trajectory based on the second penalty parameter having the higher penalty cost than the first penalty parameter, wherein prioritizing the first trajectory above the second trajectory increases a likelihood that operation of the autonomous vehicle violates the velocity constraint with respect to the crosswalk and does not violate the velocity constraint with respect to the intersection;

selecting a trajectory of the plurality of trajectories using the plurality of penalty parameters assigned to the plurality of trajectories; and causing the autonomous vehicle to navigate along the selected trajectory.

8. A system, comprising at least one processor, and at least one memory storing instructions thereon that, when executed by the at least one processor, cause the at least one processor to perform operations comprising:

obtaining sensor data associated with an environment in which an autonomous vehicle is operating, the sensor data generated by at least one sensor of an autonomous vehicle operating in the environment;

obtaining an intersection parameter indicative of an intersection boundary for an intersection and a crosswalk located in the environment;

determining a traffic light status based at least in part on the sensor data;

determining at least one longitudinal progress constraint based on a state of the autonomous vehicle and a velocity constraint, wherein the at least one longitudinal progress constraint indicates that the autonomous vehicle is to pass through the intersection within a time threshold, wherein the time threshold is based at least in part on the traffic light status;

generating a plurality of trajectories for operation of the autonomous vehicle;

determining a first penalty parameter indicative of a first violation of the at least one longitudinal progress constraint and a first violation of the velocity constraint with respect to the crosswalk, wherein the first penalty parameter has an associated penalty cost;

determining a second penalty parameter indicative of a second violation of the at least one longitudinal progress constraint and a second violation of the velocity constraint with respect to the intersection, wherein the second penalty parameter has a higher penalty cost than the first penalty parameter;

prioritizing the plurality of trajectories based on a plurality of penalty parameters, wherein the plurality of penalty parameters comprises the first penalty parameter and the second penalty parameter, wherein the first penalty parameter is assigned to a first trajectory of the plurality of trajectories and the second penalty parameter is assigned to a second trajectory of the plurality of trajectories, wherein the first trajectory is prioritized above the second trajectory based on the second penalty parameter having the higher penalty cost than the first penalty parameter, wherein prioritizing the first trajectory above the second trajectory increases a likelihood that operation of the autonomous vehicle violates the velocity constraint with respect to the crosswalk and does not violate the velocity constraint with respect to the intersection;

selecting a trajectory of the plurality of trajectories using the plurality of penalty parameters assigned to the plurality of trajectories; and causing the autonomous vehicle to navigate along the selected trajectory.

9. The system of claim 8, wherein generating the plurality of trajectories comprises:

determining, based on the sensor data, an agent in the environment;

predicting movement of the agent; and generating, based on the movement of the agent, the plurality of trajectories.

10. The system of claim 8, wherein the sensor data is indicative of one or more of: traffic light status and crosswalk status.

11. The system of claim 8, wherein selecting the trajectory of the plurality of trajectories comprises:

selecting the trajectory of the plurality of trajectories indicating a stopping of the autonomous vehicle prior to the intersection boundary.

12. The system of claim 8, wherein generating the plurality of trajectories comprises:

determining whether the sensor data is indicative of a lane interaction parameter, wherein the lane interaction parameter is indicative of one or more of: a shared entry, a shared exit, a disjoint entry, and a disjoint exit;

wherein selecting the trajectory of the plurality of trajectories comprises selecting, based on the lane interaction parameter, the trajectory.

* * * * *